United States Patent
Axén et al.

(10) Patent No.: US 10,536,873 B2
(45) Date of Patent: Jan. 14, 2020

(54) TECHNIQUE FOR DETERMINING SIGNAL QUALITY

(71) Applicant: Telefonaktiebolaget LM Ericsson (publ), Stockholm (SE)

(72) Inventors: Rasmus Axén, Linköping (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/086,802

(22) PCT Filed: Jan. 2, 2018

(86) PCT No.: PCT/EP2018/050040
§ 371 (c)(1),
(2) Date: Sep. 20, 2018

(87) PCT Pub. No.: WO2018/127481
PCT Pub. Date: Jul. 12, 2018

(65) Prior Publication Data
US 2019/0090150 A1 Mar. 21, 2019

Related U.S. Application Data

(60) Provisional application No. 62/443,094, filed on Jan. 6, 2017.

(51) Int. Cl.
| | |
|---|---|
| *H04L 12/28* | (2006.01) |
| *H04W 24/10* | (2009.01) |
| *H04W 36/00* | (2009.01) |
| *H04B 7/0417* | (2017.01) |
| *H04J 11/00* | (2006.01) |
| *H04W 24/06* | (2009.01) |

(52) U.S. Cl.
CPC .......... *H04W 24/10* (2013.01); *H04B 7/0417* (2013.01); *H04J 11/0073* (2013.01);
(Continued)

(58) Field of Classification Search
CPC . H04W 24/10; H04W 24/06; H04W 36/0094; H04J 11/0079; H04J 11/0073; H04B 7/0417
(Continued)

(56) References Cited

U.S. PATENT DOCUMENTS 9,392,608 B2 * 7/2016 Song ...................... H04W 72/08
9,642,165 B2 * 5/2017 Jung .................... H04B 7/0617
(Continued)

FOREIGN PATENT DOCUMENTS

EP 2938133 A1 10/2015

OTHER PUBLICATIONS

Ericsson, "Sync signal options for active mode mobility RS", 3GPP TSG-RAN WG1 Meeting #88, Athens, Greece, Feb. 13, 2017, pp. 1-3, R1-1702130, 3GPP.
(Continued)

*Primary Examiner* — Thai D Hoang
(74) *Attorney, Agent, or Firm* — Coats & Bennett, PLLC

(57) ABSTRACT

A technique for determining signal quality of a radio access network, RAN, (502) comprising a plurality of transmission-reception points, TRxPs (504), is described. A method aspect of the technique comprises or initiates receiving a control message for determining the signal quality based on a measurement of a reference signal (516.21) from a second TRxP (504.4) at a radio resource. The control message is indicative of the radio resource for the reference signal relative to a synchronization signal (512.1) from a first TRxP (504.1; 504.2; 504.3) other than the second TRxP.

22 Claims, 7 Drawing Sheets

(52) U.S. Cl.
CPC ......... *H04J 11/0079* (2013.01); *H04W 24/06* (2013.01); *H04W 36/0094* (2013.01)

(58) Field of Classification Search
USPC ................ 370/230–231, 252–253, 329–330, 370/338–348
See application file for complete search history.

(56) References Cited

U.S. PATENT DOCUMENTS

| 2016/0337922 | A1* | 11/2016 | Mustajarvi | H04W 36/22 |
| 2018/0070266 | A1* | 3/2018 | Tomeba | H04W 84/12 |
| 2018/0343043 | A1* | 11/2018 | Hakola | H04B 7/0417 |

OTHER PUBLICATIONS

Ericsson, "RRM measurements and mobility control in RRC Connected", 3GPP TSG-RAN WG2 #94, Gothenburg, Sweden, May 22, 2016, pp. 1-3, Tdoc R2-165540, 3GPP.

Convida Wireless, "RRC Based mobility Management in NR", 3GPP TSG-RAN WG2 Meeting #95bis, Reno, US, Nov. 14, 2016, pp. 1-4, R2-168776, 3GPP.

Nokia et al., "Mobility Measurements in Idle and inactive Mode", 3GPP TSG-RAN WG2 NR Adhoc, Spokane, US, Jan. 17, 2017, pp. 1-5, R2-1700113, 3GPP.

Catt, "Scenarios for intra-cell system information delivery", 3GPP TSG-RAN WG2 Meeting #96, Reno, US, 2016-11-14, pp. 1-5, R2-167958, 3GPP.

NTT Docomo, "New SID Proposal: Study on New Radio Access Technology", 3GPP TSG RAN Meeting #71, Göteborg, Sweden, Mar. 7, 2016, pp. 1-8, RP-160671, 3GPP.

3rd Generation Partnership Project, "3rd Generation Partnership Project; Technical Specification Group Radio Access Network; Study on Scenarios and Requirements for Next Generation Access Technologies; (Release 14)", Technical Report, 3GPP TR 38.913 V14.0.0, Oct. 1, 2016, pp. 1-39, 3GPP, France.

3rd Generation Partnership Project, "3rd Generation Partnership Project; Technical Specification Group Services and System Aspects; Study on Architecture for Next Generation System (Release 14)", Technical Report, 3GPP TR 23.799 V14.0.0, Dec. 1, 2016, pp. 1-522, 3GPP, France.

\* cited by examiner

TECHNIQUE FOR DETERMINING SIGNAL QUALITY

TECHNICAL FIELD

The present disclosure generally relates to a technique for determining signal quality of a radio access network. More specifically, and without limitation, methods and devices are provided for determining the signal quality at a radio device connected or connectable to the radio access network.

BACKGROUND

The development of New Radio (NR) systems, e.g., coordinated by the International Telecommunication Union (ITU) and the Third Generation Partnership Project (3GPP), is led by overall requirements for the Next Generation (NG) architecture (e.g., according to the document TR 23.799, "Study on Architecture for Next Generation") and more specifically for the NG Access Technology (e.g., according to the document TR 38.913, "Study on Scenarios and Requirements for Next Generation Access Technologies"; and document RP-160671, "New SID Proposal: Study on New Radio Access Technology", DoCoMo), which require new mechanisms for the mobility of a radio device connected to such NR systems compared to the current mobility solution in 3GPP Long Term Evolution (LTE). Some of these requirements include supporting network energy efficiency mechanisms and a very wide range of frequencies (e.g., up to 100 GHz).

In conventional LTE systems, a user equipment (UE) is capable of detecting synchronization signals transmitted from any cell within range and measure reference signals (RSs) from same cell assuming that the transmission of the synchronization signal and the transmission of the associated RSs from the same cell are synchronized and time-aligned. That is, by virtue of this self-contained cell discovery, the UE is able to perform blind detection, identification and measurement of any cell.

For LTE handover, the UE reports discovered cells to the serving cell currently connected to. A cell identity, i.e. the physical cell identifier (PCI) acquired by the UE from primary and secondary synchronization signals of the discovered cell, and a carrier frequency are stored at the evolved Node B (eNB) of the serving cell for table look-up when determining a target cell detected and reported by the UE. By acquiring the Cell Global Identifier (CGI) or the E-UTRAN CGI (ECGI) of reported candidate cells, the eNB can globally identified the candidate target cells and update its table.

For handover in LTE, the source eNB initializes handover preparation and execution after receiving an event or a report containing the PCI. The source eNB performs the table look-up for translating the PCI to a target eNB and target cell. Handover preparation is initiated by the source eNB by signaling towards the selected target eNB of the target cell. The target eNB assembles a reconfiguration message that the source eNB sends to the UE in a Radio Resource Control (RRC) message. The reconfiguration message contains the mobility command together with information about resources the UE should use in the target cell, such as preamble sequence for random access and Cell-specific Radio Network Temporary Identifier (C-RNTI).

The deployment of a NR system is more flexible than LTE deployment by centralizing upper control protocol layers, e.g. the RRC layer, in a network server (or "cloud"). The lower protocol layers, e.g. the Medium Access Control (MAC) layer, which are more sensitive to delay, are deployed closer to the antenna site to minimize latency, e.g. at a Transmission-Reception Point (TRxP). The NR system may or may not be deployed in cells ("NR cells"). Moreover, the NR cell may include an aggregation of TRxPs. The TRxPs may provide a joint transmission and reception from one or several TRxPs, which may also be geographically distributed.

SUMMARY

Given the existing LTE handover solutions, a general problem for the mobility of a radio device moving between TRxPs or NR cells is that the lower protocol layers implemented at the TRxPs, such as the Radio Link Control (RLC) layer, the MAC layer and the physical (PHY) layer, have no mobility-related support in terms of mobility measurement control, measurement reporting and mobility-based resource reconfigurations of lower protocol layers. Thus, there is no solution for how higher protocol layer mobility functionality interacts with lower protocol layer functions to achieve mobility in NR systems.

One specific problem of the existing handover solutions in LTE is that the lower layers of the UE are strictly dependent on that the UE detects a cell synchronization signal and that the UE can assume that the transmissions of the synchronization signal and the RSs are synchronized in time.

Accordingly, there is a need for a technique that provides a basis for mobility on lower protocol layers.

According to one aspect, a method of determining signal quality of a radio access network (RAN) is provided. The RAN comprises a plurality of transmission-reception points (TRxPs). The method comprises or initiates a step of receiving a control message for determining the signal quality based on a measurement of a reference signal from a second TRxP at a radio resource, the control message being indicative of the radio resource for the reference signal relative to a synchronization signal from a first TRxP other than the second TRxP.

The method may be performed by, or implemented at, a radio device. The method may be implemented for determining the signal quality of the RAN as received at the radio device. The radio device may be radio-connected or radio-connectable to the RAN, e.g., to at least one of the first TRxP and the second TRxP.

The control message may be received at the radio device. The method may further comprise or initiate a step of determining and/or reporting the signal quality based on a measurement of the reference signal from the second TRxP at the radio resource. The signal quality may be determined and/or reported by the radio device. The radio device may perform the measurement. The signal quality may be determined and/or reported for a plurality of TRxPs, e.g., including the TRxP currently used by the radio device as the synchronization source. At the time of receiving the control message, the radio device may or may not use the first TRxP as synchronization source for its radio connectivity with the RAN.

By virtue of the control message, the RAN may inform the radio device as to which of the one or more synchronization signals provided by the RAN is usable for detecting and measuring one or more reference signal transmissions of the RAN. Alternatively or in addition, the control message may be indicative of whether two or more synchronization signals are to be assumed equal, e.g., in terms of providing the same timing reference and/or frequency reference to a radio device for detecting and measuring one or more reference signal transmissions. Alternatively or in addition, the information provided by the control message may be used by the radio device for detecting a radio link failure and/or for a more robust beam management.

The signal quality determined according to the method may provide a basis for mobility, e.g., beam management and handover. The mobility may encompass mobility between cells (e.g., New Radio or NR cells) and/or between TRxPs and beams (e.g., from the TRxPs), e.g., in contrast to a conventional handover on cell-level.

The reference signals may include reference signals for link adaptation and/or beam management. Alternatively or in addition, the reference signals may include reference signals for mobility measurements (e.g. with respect to cells and/or TRxPs) and/or radio link failure supervision. For example, the reference signals at the indicated resources may include Channel State Information Reference Signals (CSI-RS).

Furthermore, an implementation of the method may control the mobility. The mobility may be controlled based on the determined signal quality. The technique can be implemented to perform the mobility faster as compared to a cell handover in LTE, e.g., by controlling the mobility at lower protocol layers. For example, beamforming and/or joint transmission and reception of TRxPs may be controlled based on the determined signal quality. The RAN (e.g., the second TRxP) and/or the radio device may perform beamforming by means of channel coefficients and/or a precoding matrix determined based on the signal quality. Alternatively or in addition, weights and/or phases between TRxPs may be determined for joint transmission and/or reception of the TRxPs based on the signal quality.

The fast mobility is particularly significant for radio conditions at frequencies higher than those used by conventional LTE for the radio connection between eNB and UE, because the radio conditions vary faster and/or more dynamically when using higher carrier frequencies and beamforming. For higher frequencies, e.g. above 6 GHz, the beamforming can achieve beams with narrow widths and sharp beam edges, so that radio propagation condition are sensitive to surroundings of the radio device and/or to obstructions between the TRxPs and the radio device.

The control message may be indicative of the radio resource based on the synchronization signal. By virtue of an implementation of the method, the radio device can identify (e.g., at the indicated radio resource) the reference signal, measure the reference signal (e.g., on a beam from the second TRxP) and/or report the signal quality of the second TRxP to the RAN, e.g., even if the only synchronization signal that is received or used by the radio device is the synchronization signal from the first TRxP (e.g., received on a specific beam from the first TRxP).

Receiving the synchronization signal from the first TRxP may also be referred to as detecting the synchronization signal or synchronizing with the first TRxP. For measuring the reference signal from the second TRxP, the radio device may receive at the radio resource indicated by the control message relative to the synchronization signal from the first TRxP. The control message may relate the radio resource relative to the synchronization signal in the time domain and/or the frequency domain (which may also be referred to as the relation indicated by the control message).

Same or further implementations can improve the energy efficiency of the network and/or the radio device by transmitting and receiving, respectively, less synchronizations signals. For example, the radio time per TRxP occupied by the synchronization signals may be less than the radio time per eNB occupied by LTE synchronization signals (e.g., P-SS and S-SS).

The control message may relate one or more pairs of TRxPs of the RAN. Each pair may refer to an instance of the first TRxP as the source of the synchronization signal and an instance of the second TRxP as the source for the reference signal.

The method may further comprise or initiate a step of receiving the synchronization signal from the first TRxP of the RAN. The second TRxP may also be a source for synchronization signals. Receiving the synchronization signals from the first and second TRxPs may allow identifying the first and second TRxPs, respectively.

As to timing and/or frequency, the synchronization signals from the first TRxP may be equivalent to, or offset relative to, the synchronization signals from the second TRxP. The control message may be indicative of synchronization sources (e.g., the first TRxP or multiple first TRxPs) for measuring the reference signals from another synchronization source (e.g., the second TRxP or multiple second TRxPs). For example, the control message may be indicative of the equivalence or the offset. Alternatively or in addition, the control message may informs the radio device about which group of TRxPs (e.g., including the first and second TRxPs) are equivalent or offset (e.g., by indicating the offset). Any synchronization source in the group of equivalent synchronization sources may be used by the radio device (e.g., as a time basis and/or a frequency basis) for measuring the reference signals from any TRxP belonging to the group. In case the control message is indicative of an offset, the time basis and/or the frequency basis may be shifted according to the indicated offset.

The radio device may or may not be radio-connected to the first TRxP when receiving the synchronization signal. For example, the radio device may be connected to via a TRxP other than both the first and the second TRxPs when receiving the synchronization signal. Alternatively, the radio device may be in an idle mode when receiving the synchronization signal, wherein the control message or its relation has been received in a previous connected mode and stored at the radio device.

A plurality of synchronization signals may be received. Out of the plurality of synchronization signals, the radio device may select the strongest synchronization signal for which one or more of the control messages have been received. The radio device may measure the reference signal at the radio resource indicated by the control message in terms of the selected synchronization signal.

The TRxPs may also be referred to as transmission points of the RAN, radio signal sources of the RAN or access points of the RAN. For example, any or each TRxP may comprise an antenna array with one or more antenna elements available to the RAN and located at a specific geographical location for a specific area (e.g., the corresponding NR cell).

The control message may be received from the first TRxP and/or the TRxP though which the radio device is currently connected to the RAN. Alternatively or in addition, the control message may be received from a node of the RAN (e.g., a node in a backhaul network of the RAN or a core network connected to the RAN) and/or through an interface of the RAN. Alternatively or in addition, the control message may be received from a third TRxP other than both the first TRxP and second TRxP.

The control message may be indicative of the radio resource relative to the synchronization signal by relating at least one of a timing and a frequency specified by the synchronization signal from the first TRxP to at least one of a timing and a frequency of the second TRxP. Alternatively or in addition, the control message may be indicative of the radio resource within a first radio resource structure defined based on the synchronization signal from the first TRxP.

The synchronization signal may define a first radio resource structure, e.g., as to time and/or frequency. The control message may be directly or explicitly indicative of the radio resource. For example, the control message may be indicative of the radio resource relative to the first radio resource structure or relative to the synchronization signal.

Alternatively or in addition, the control message may be indirectly or implicitly indicative of the radio resource. For example, the control message may be indicative of a second radio resource structure of the second TRxP relative to the first radio resource structure or relative to the synchronization signal. The radio resource from the second TRxP may be predefined (e.g., defined by a technical standard) within the second radio resource structure of the second TRxP.

Alternatively or in addition, the control message may be indicative of the radio resource relative to the synchronization signal by relating a first radio resource structure specified by the synchronization signal from the first TRxP to a second radio resource structure of the second TRxP. The first radio resource structure may include a time-frequency grid. The radio resource may be defined in a time-frequency grid that is based on the synchronization signal.

Alternatively or in addition, the control message may be indicative of the radio resource relative to the synchronization signal by indicating at least one of an equivalence and an offset between a first radio resource structure specified by the synchronization signal from the first TRxP and a second radio resource structure of the second TRxP.

The control message may be indicative of the radio resource relative to the synchronization signal by indicating equivalence between a first timing specified by the synchronization signal from the first TRxP and a second timing of the second TRxP or by indicating synchronization between the first TRxP and the second TRxP. Alternatively or in addition, the control message may be indicative of the radio resource relative to the synchronization signal by indicating a time offset between a first timing specified by the synchronization signal from the first TRxP and a second timing of the second TRxP. E.g., the control message may be indicative of the time offset of the second timing used for transmitting the reference signal from the second TRxP relative to the first timing used by the first TRxP.

The control message may be indicative of the radio resource relative to the synchronization signal by indicating equivalence between a first frequency specified by the synchronization signal from the first TRxP and a second frequency of the second TRxP, and/or by indicating an intra-frequency relation between the first TRxP and the second TRxP. E.g., the second TRxP may transmit the reference signal on the first frequency. Alternatively or in addition, the control message may be indicative of the radio resource relative to the synchronization signal by indicating a frequency offset between a first frequency specified by the synchronization signal from the first TRxP and a second frequency of the second TRxP. E.g., the second TRxP may transmit the reference signal on the second frequency.

The control message may further be indicative of a periodicity and/or a time-frequency pattern of the reference signal from the second TRxP.

The second TRxP may be another TRxP of the same RAN. Alternatively or in addition, the first TRxP and/or the second TRxP may be base stations of the RAN.

The first TRxP and the second TRxP may support or belong to different cells of the RAN. The RAN may comprises a plurality of cells. Each cell may comprise at least one of the TRxPs. Alternatively or in addition, the first TRxP and the second TRxP may support or provide different beams of the RAN. The RAN may provide a plurality of beams. The synchronization signals and/or the reference signals may be provided to the radio device from different beams, e.g., within one cell. Each beam may be supported or provided by at least one TRxP.

Each of the beams may be associated with a beam identifier. The beam may also be referred to as a radio beam. The beam may be achieved by the beamforming. The beamforming may use an antenna array. Some or each of the TRxPs may comprise an antenna array. The term "beam" may encompass any directional characteristic, e.g., for transmission and/or reception.

The first TRxP may be associated with at least one of a first cell identifier and a first beam identifier. Alternatively or in addition, the second TRxP may be associated with at least one of a second cell identifier different from the first cell identifier and a second beam identifier different from the first beam identifier. The first cell identifier and/or the second cell identifier may be a first physical cell identifier (PCI) and a second PCI, respectively.

The first cell identifier and/or the first beam identifier of the first TRxP may be encoded in the synchronization signal. The synchronization signal may include a primary synchronization signal (P-SS) and a secondary synchronization signal (S-SS). A first portion of the first PCI may be encoded in the P-SS. A second portion of the first PCI may be encoded in the S-SS.

The synchronization signal from the first TRxP may also be referred to as a first synchronization signal. The second TRxP may transmit a second synchronization signal. The second synchronization signal may be encoded with the second cell identifier and/or the second beam identifier.

The control message may refer to the synchronization signal from the first TRxP by including in the control message the first cell identifier and/or the first beam identifier of the first TRxP. Alternatively or in addition, the control message indicative of the radio resource may associate the radio resource with the second TRxP by including in the control message the second cell identifier and/or the second beam identifier of the second TRxP.

The control message may be indicative of a plurality of radio resources for reference signals from a plurality of second TRxPs. For example, the control message may be indicative of the plurality of radio resources for the reference signals relative to synchronization signals from a plurality of first TRxPs. Each of the radio resources indicated by the control message may be associated with one of the second TRxPs by including in the control message the second cell identifier and/or the second beam identifier of the corresponding one of the second TRxPs. Alternatively or in addition, each of the synchronization signals may be associated with one of the first TRxPs by including in the control message the first cell identifier and/or the first beam identifier of the corresponding one of the first TRxPs.

A set of second TRxPs whose radio resources are indicated by the control message relative to the synchronization signal from one of the first TRxPs may (e.g., partially) overlap with another set of second TRxPs whose radio resources are indicated by the same control message relative to the synchronization signal from another one of the first TRxPs. Alternatively or in addition, the control message may indicate the equivalence or the offset for one or more pairs. For example, each pair may include a first identifier (e.g., identifying an instance of the first TRxP), a second identifier (e.g., identifying an instance of the second TRxP) and an indicator for the equivalence or the offset. The first and second identifiers in each pair may be different. Each of the first identifier and the second identifier may include a cell identifier, a beam identifier or a combination thereof.

The signal quality may be determined for some or each of the second TRXPs by measuring the one or more reference signals from the corresponding one of the second TRXPs. The method may further comprise or initiate a step of reporting, to the RAN, the one or more determined signal qualities. Some or each of the determined signal qualities may be reported. The report to the RAN may include some or each of the determined signal qualities in association with the corresponding second TRxP by including in the report the second identifier of the corresponding second TRxP.

The at least one determined signal quality may be reported to the first TRxP and/or the TRxP through which the radio device is currently connected to the RAN.

Each of the at least one determined signal quality may include or may be included in channel state information (CSI), channel quality information (CQI) and/or a precoding matrix indicator (PMI). The at least one reference signal may include at least one channel state information reference signal (CSI-RS).

The at least one determined signal quality may be indicative of at least one channel estimate based on the corresponding reference signal. Alternatively or in addition, the at least one determined signal quality may be indicative of at least one received power of the corresponding reference signal (or reference signal received power, RSRP).

The control message may be a control message dedicated to the radio device (e.g., the RRC message). A radio resource control (RRC) message (also: RRC signaling) may include or implement the control message. The control message may be received according to a packet data convergence protocol (PDCP).

The control message may be received after (e.g., in response to) entering an RRC connected mode with the RAN (e.g., from the TRxP through which the connection has been established, the first TRxP and/or the second TRxP of the RAN). Alternatively or in addition, a broadcast message may include or implement the control message. For example, the control message may be encoded in the synchronization signal or a beacon frame.

The method may further comprise or initiate a step of transmitting data to the RAN and/or receiving data from the RAN based on the at least one determined or reported signal quality. For example, a scheme for coding and/or modulation used for the transmission and/or reception may depend on the at least one determined or reported signal quality.

The transmission and/or the reception may use beamforming and/or a multiple-input multiple-output (MIMO) radio channel. Parameters of the beamforming or the MIMO channel (e.g., precoding coefficients, gain coefficients and/or weight coefficients) may be controlled depending on the at least one determined or reported signal quality.

A throughput of the transmission and/or the reception may be optimized or maximized based on the at least one determined or reported signal quality. For example, the data flow (e.g., from or to the radio device) may be directed through the TRxP having the highest signal quality. Alternatively or in addition, the transmission and/or the reception may include a coordinated multipoint (CoMP) transmission and/or a CoMP reception using the first and second TRxPs.

The transmission and/or the reception may include a handover from the first TRxP to the second TRxP based on the at least one determined or reported signal quality. The handover may be triggered by the report. In one variant, the handover may include a redirection of the data flow (e.g., from or to the radio device). The redirection may be transparent to the radio device or the RRC protocol. In one variant, the report may trigger a handover involving RRC signaling to the radio device.

As to another aspect, a method of determining signal quality of a radio access network (RAN) is provided. The RAN comprises a plurality of transmission-reception points (TRxPs). The method comprises or initiates a step of transmitting a control message for determining the signal quality based on a measurement of a reference signal from a second TRxP at a radio resource, the control message being indicative of the radio resource for the reference signal relative to a synchronization signal from a first TRxP other than the second TRxP.

The method may be performed by, or implemented at, the RAN, e.g., the first TRxP. Alternatively or in addition, the method (e.g., the initiation of the steps) may be performed by a node (e.g., in a backhaul network or a core network) connected to the RAN.

The method may be implemented for determining the signal quality of the RAN at a radio device. The control message may be transmitted to the radio device. The information as to the determined signal quality may be received from the radio device.

The method may further comprise or initiate a step of receiving a report of, and/or a radio communication based on, the signal quality determined based on the measurement of the reference signal from the second TRxP at the radio resource.

The radio device may report the signal quality (e.g., for a Frequency Division Duplex, FDD, radio communication with the RAN) involving the second TRxP. The RAN (e.g., the second TRxP) may steer its radio beam or its receiver sensitivity towards the radio device based on the reported signal quality (e.g., including a PMI). Alternatively or in addition, the radio device may use the signal quality for a radio communication (e.g., a Time Division Duplex, TDD, radio communication with the RAN) involving the second TRxP. The radio device may steer its radio beam or its receiver sensitivity towards the second TRxP based on the determined signal quality (e.g., including a precoding matrix).

Above other method aspect may further comprise any feature disclosed in the context of the first-mentioned one method aspect and/or one or more steps corresponding to any of the steps of the one method aspect.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the RAN and/or the Internet. Alternatively or in addition, any of the steps of the method aspects may be encoded in a field-programmable gate array (FPGA) and/or an application-specific integrated circuit (ASIC), or the functionality may be provided for download by means of a hardware description language.

As to one device aspect, a device for determining signal quality of a radio access network (RAN) is provided. The RAN comprises a plurality of transmission-reception points (TRxPs). The device may be configured to perform the one method aspect. Alternatively or in addition, the device comprises a receiving unit configured to receive a control message for determining the signal quality based on a measurement of a reference signal from a second TRxP at a radio resource, the control message being indicative of the radio resource for the reference signal relative to a synchronization signal from a first TRxP other than the second TRxP.

As to another device aspect, a device for determining signal quality of a radio access network (RAN) is provided. The RAN comprises a plurality of transmission-reception points (TRxPs). The device may be configured to perform the other method aspect. Alternatively or in addition, the device comprises a transmitting unit configured to transmit a control message for determining the signal quality based on a measurement of a reference signal from a second TRxP at a radio resource, the control message being indicative of the radio resource for the reference signal relative to a synchronization signal from a first TRxP other than the second TRxP.

As to one further aspect, a radio device configured for determining signal quality of a radio access network (RAN) is provided. The RAN comprises a plurality of transmission-reception points (TRxPs). The radio device may be connected or connectable to the RAN. The radio device may comprise the device according to the one device aspect or may be configured to perform the one method aspect. Alternatively or in addition, the radio device comprises a control message reception module for receiving a control message for determining the signal quality based on a measurement of a reference signal from a second TRxP at a radio resource, the control message being indicative of the radio resource for the reference signal relative to a synchronization signal from a first TRxP other than the second TRxP.

As to another further aspect, a transmission-reception point (TRxP) configured for determining signal quality of a radio access network (RAN) is provided. The RAN comprises a plurality of TRxPs. The TRxP may be configured to provide radio connectivity in the RAN. The TRxP may comprise the device according to the other device aspect or may be configured to perform the other method aspect. Alternatively or in addition, the TRxP comprises a control message transmission module for transmitting a control message for determining the signal quality based on a measurement of a reference signal from a second TRxP at a radio resource, the control message being indicative of the radio resource for the reference signal relative to a synchronization signal from a first TRxP other than the second TRxP.

The devices and/or the TRxP may further include any feature disclosed in the context of the method aspects. Particularly, any one of the units and modules, or a dedicated unit or module, may be configured to perform one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for New Radio (NR) system according to 5G networks, it is readily apparent that the technique described herein may also be implemented in any other wireless communication network, including a Long Term Evolution (LTE) implementation or a successor thereof, a Wireless Local Area Network (WLAN) according to the standard family IEEE 802.11 (Wi-Fi), a Vehicle-to-Everything (V2X) ad-hoc Wi-Fi network according to the standard ETSI EN 302 571 and/or a cellular V2X network according to 3GPP Release 14 or a successor thereof.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

Figure 1:
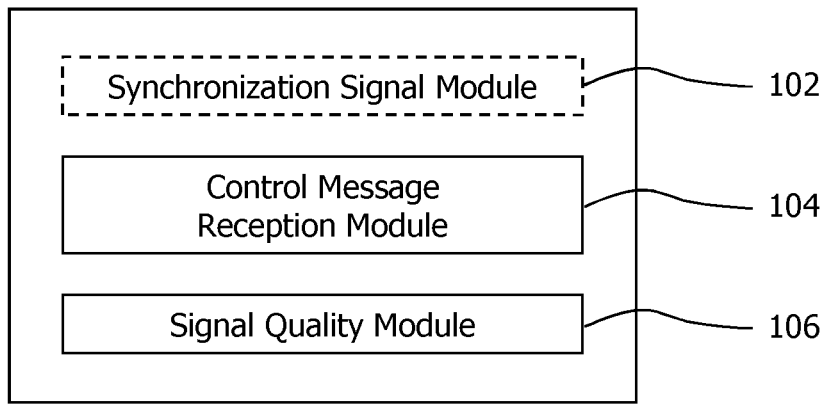
FIG. 1 shows a schematic block diagram of a device for determining signal quality of a radio access network, which is implementable at a radio device connected or connectable to the radio access network.

FIG. 1 schematically illustrates a block diagram of a device 100 for determining signal quality of a radio access network (RAN) comprising a plurality of transmission-reception points (TRxPs). The device 100 comprises a control message reception module 104 for receiving a control message for determining the signal quality based on a measurement of a reference signal from a second TRxP at a radio resource. The received control message is indicative of the radio resource for the reference signal relative to a synchronization signal from a first TRxP other than the second TRxP. The device 100 optionally comprises a synchronization signal module 102 for receiving the synchronization signal from the first TRxP of the RAN. The device 100 further comprises a determining module 106 for determining or reporting the signal quality based on a measurement of the reference signal from the second TRxP at the radio resource.

The device 100 may be embodied by a radio device connected or connectable to the RAN.

Figure 2:
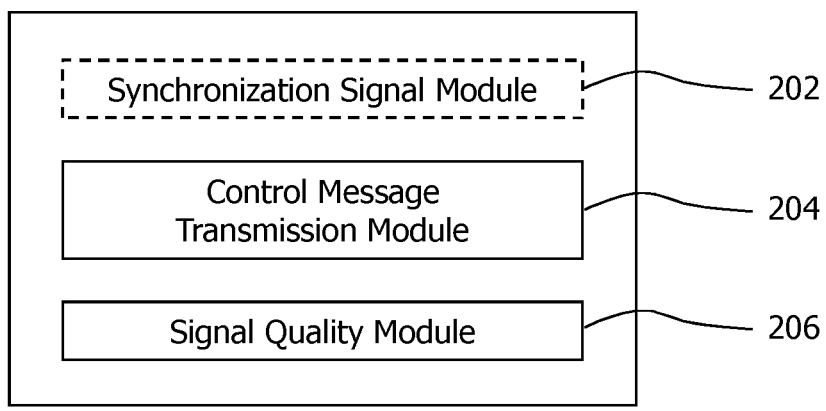
FIG. 2 shows a schematic block diagram of a device for determining signal quality of a radio access network, which is implementable at the radio access network.

FIG. 2 schematically illustrates a block diagram of a device 200 for determining signal quality of a RAN comprising a plurality of TRxPs. The device 200 comprises a control message transmission module 204 for transmitting a control message for determining the signal quality based on a measurement of a reference signal from a second TRxP at a radio resource. The transmitted control message is indicative of the radio resource for the reference signal relative to a synchronization signal from a first TRxP other than the second TRxP. The device 200 optionally comprises a synchronization signal module 202 for transmitting or initiating to transmit the synchronization signal from the first TRxP of the RAN. The device 200 further comprises a signal quality module for receiving or initiating to receive a report of the determined signal quality and/or a radio communication based on the determined signal quality, wherein the signal quality is determined based on the measurement of the reference signal from the second TRxP at the radio resource.

The device 200 may be embodied by the RAN, e.g., a node or TRxP of the RAN, or a node connected to the RAN.

Figure 3:
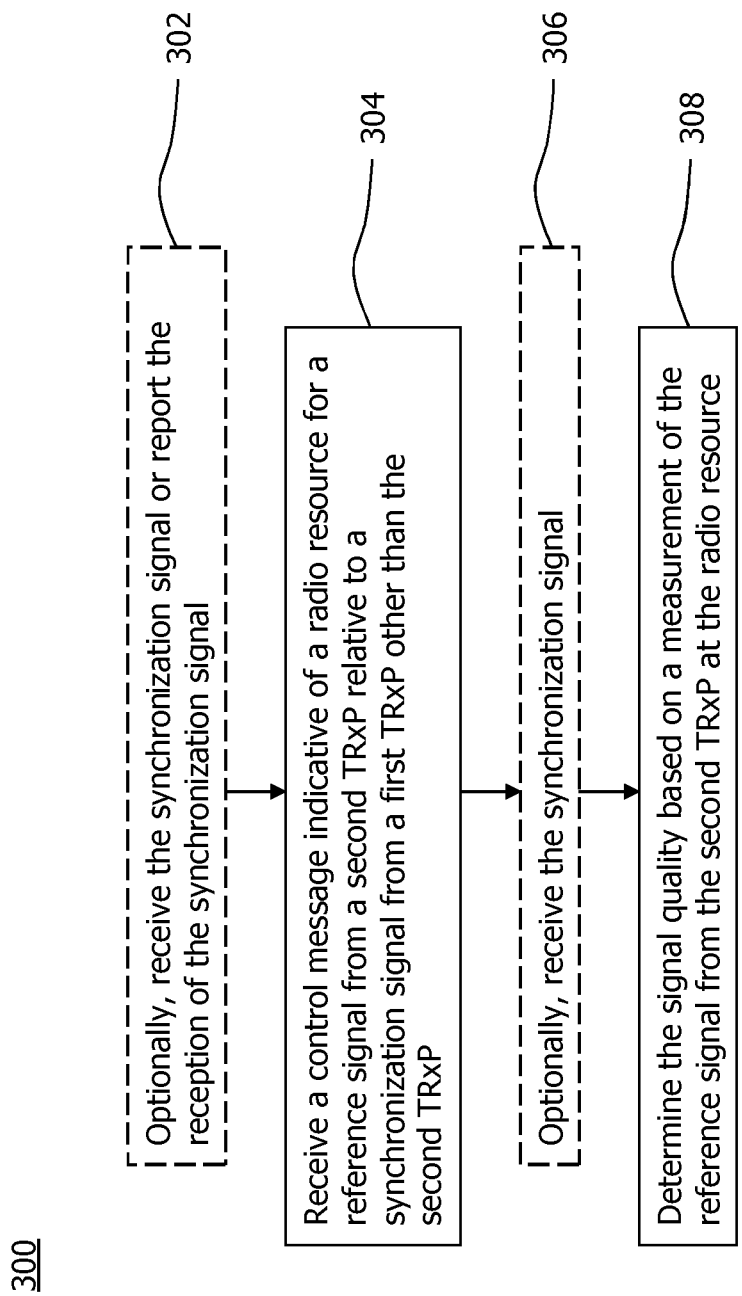
FIG. 3 shows a flowchart for a method of determining signal quality of a radio access network, which is implementable by the device of FIG. 1.

FIG. 3 shows a method 300 of determining signal quality of a RAN. The RAN comprises a plurality of TRxPs. The method 300 comprises or initiates a step 304 of receiving a control message for determining the signal quality based on a measurement of a reference signal from a second TRxP at a radio resource. The control message is indicative of the radio resource for the reference signal relative to a synchronization signal from a first TRxP other than the second TRxP. The synchronization signal from the first TRxP may be received in a step 302 prior to receiving the control message in the step 304. Alternatively or in addition, the synchronization signal is received from the first TRxP in a step 306 after receiving the control message in the step 304. Given the synchronization information of the synchronization signal, the radio resource for measuring the reference signal from the second TRxP is defined by the control message. The signal quality is determined in a step 308 based on the measurement.

If the synchronization signal is received in the step 302 prior to the step 304, the measurement for the step 308 may be scheduled in response to the step 304. If the synchronization signal is received in the step 306 only after the step 304, the measurement for the step 308 may be scheduled in response to the step 306.

The method 300 may be performed by the device 100, e.g., at the radio device. For example, the module 102 may perform or initiate the steps 302 and 306. The modules 104 and 106 may perform the steps 304 and 308, respectively.

Figure 4:
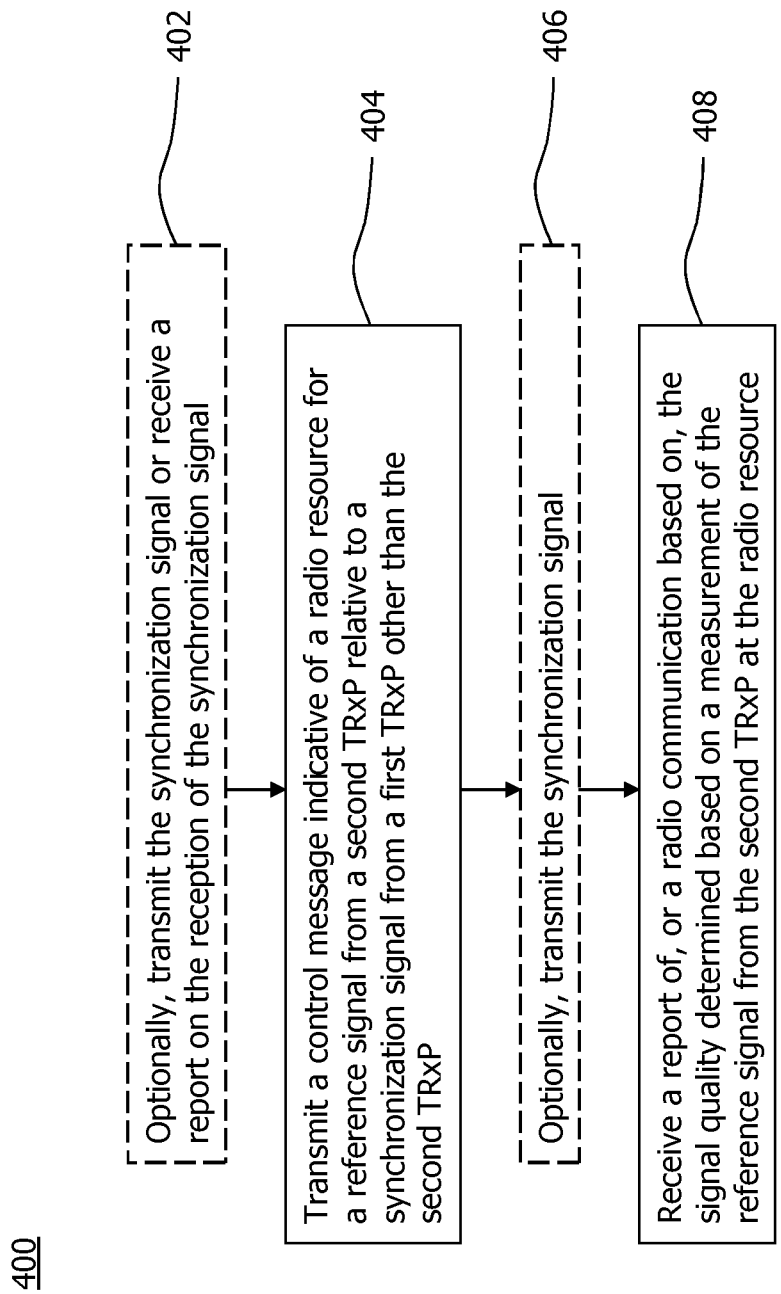
FIG. 4 shows a flowchart for a method of determining signal quality of a radio access network, which is implementable by the device of FIG. 2.

FIG. 4 shows a flowchart for a method 400 of determining signal quality of a RAN. The RAN comprises a plurality of TRxPs. The method 400 comprises or initiates a step 404 of transmitting a control message for determining the signal quality based on a measurement of a reference signal from a second TRxP at a radio resource. The control message is indicative of the radio resource for the reference signal relative to a synchronization signal from a first TRxP other than the second TRxP.

The synchronization signal from the first TRxP may be transmitted (or the transmission may be initiated) in a step 402 prior to transmitting the control message in the step 404. Alternatively or in addition, a report on the reception of the synchronization signal may be received in the step 402. The report my trigger the step 404, e.g., if the report does not include the signal quality for the second TRxP. Alternatively or in addition, the synchronization signal is transmitted from the first TRxP (or the transmission is initiated) in a step 406 after transmitting the control message in the step 404.

Given the synchronization information of the synchronization signal in the step 402 and/or 406 and relation indicated by the control message in the step 404, a radio device in the RAN is enabled to measure the reference signal from the second TRxP at the radio resource. The signal quality determined by the measurement is received in a report or used for a radio communication in a step 408.

The method 400 may be performed by the device 200, e.g., at the RAN. For example, the module 202 may perform or initiate the steps 402 and 406. The modules 204 and 206 may perform the steps 404 and 408, respectively.

The TRxPs may be base stations or may (at least partly) implement the functionality of a base station, e.g., according to a physical protocol layer and/or data link protocol layer. The radio device may be a wireless device or a portable device. In an implementation of the RAN that is compatible with 3GPP LTE, the TRxPs may include evolved Node Bs (eNBs) and/or the radio device may include a user equipment (UE).

In a NR implementation, the technique enables the radio device to utilize multiple NR TRxP transmissions of synchronization signals or to select at least one out of the multiple NR TRxP synchronization signal transmissions. For example, each of the synchronization signals is indicative of a NR Physical Cell Identifier (PCI) for blind detection. Alternatively or in addition, the technique enables the radio device to use transmissions of reference signals (e.g., reference symbols), e.g. channel state information reference symbols (CSI-RS) from TRxPs and/or on beams that are not blind-detectable by the radio device. Such reference signals transmission may further be used for beam management and/or for mobility of the radio device between TRxPs or beams with lower layer procedures (e.g., lower than the RRC layer).

Higher layer procedures, e.g. RRC signaling, may still occasionally be involved, e.g., to setup a configuration of the radio device and/or give essential information to the radio device to support the lower layer mobility. In addition, higher layer procedures may be used as in legacy RANs for higher layer mobility.

By virtue of the control information, the RAN informs the radio device as to which synchronization signals can be used for detecting and measuring which reference signal transmissions, and/or as to whether some synchronization signals are to be assumed equal in terms of providing the same timing reference and/or frequency reference to the radio device.

If the TRxPs of the RAN that are transmitting synchronization signals (each encoded by the corresponding NR PCI) to the radio device are synchronized and have adequate alignment in time when received by the radio device, the control message from the RAN instructs the radio device that it can use one (e.g., the currently strongest) synchronization signal, or that it can combine several synchronization signals as timing and/or frequency reference, when searching, finding, decoding and/or measuring a list of reference signals transmitted from the same and/or different TRxPs in the area.

The radio device may be instructed by a network to maintain an active set of NR PCIs and/or an active set of reference signals, to perform event evaluations of the determined signal qualities, and/or to report the determined signal qualities. The determined or reported signal qualities may include NR PCI power, CSI-RS power, CSI-RS quality, NR PCI timing, etc. according the network instructions. The reporting or actions taken by the radio device may be event triggered and/or periodically performed according to rules configured by the network in the radio device, e.g., using legacy RRC signaling.

Using the received reports from the radio device, the network updates the active sets and transmits or receives data on the best TRxPs. The network (e.g., the RAN) does not have to configure the radio device when changing at least one of the one or more TRxPs used for the data transmission or data reception. In most cases, changing the TRxPs is invisible for the radio device.

Figure 5:
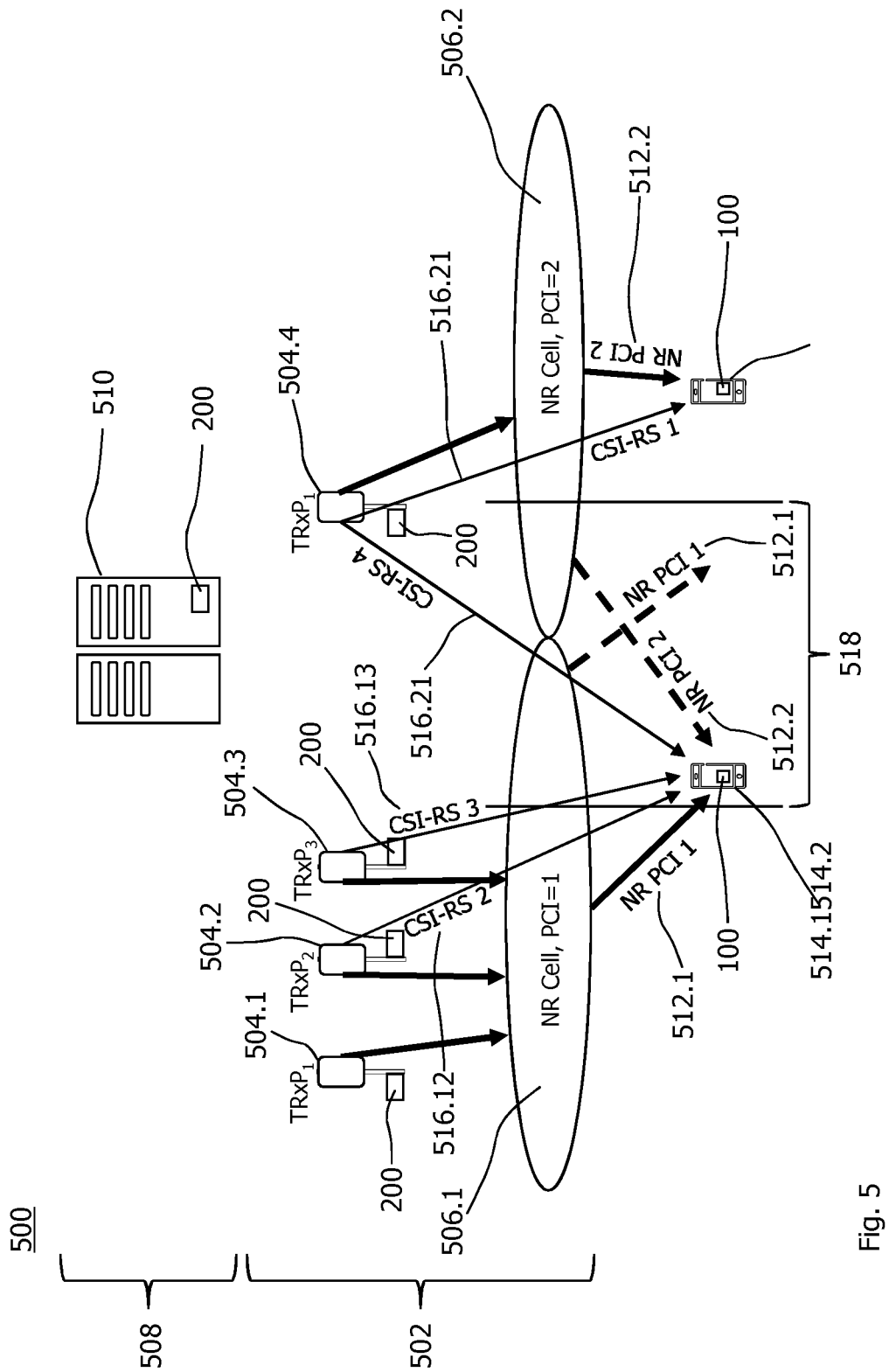
FIG. 5 schematically illustrates embodiments of the radio devices and an embodiment of a radio access network performing the methods of FIGS. 3 and 4, respectively.

FIG. 5 schematically illustrates an embodiment of a network 500. The network 500 comprises a RAN 502 including a plurality of TRxPs, which are generically referred to by reference sign 504. Some of the TRxPs 504 may be aggregated to NR cells, which are generically referred to by reference sign 506. For example, the TRxPs 504.1, 504.2 and 504.3 may belong to the NR cell 506.1 with PCI=1. The TRxP 504.4 may belong to a neighboring NR cell 506.2 with PCI=2.

Optionally, the network 500 further comprises a network 508 connected to the RAN 502. The network 508 includes a backhaul network and/or a core network for the RAN 502. Alternatively or in addition, at least some of the TRxPs 504 are connected to the Internet as an implementation of the network 508.

Instances of the device 200 may be implemented at some or each of the TRxPs 504 of the RAN 502. Alternatively or in addition, an instance of the device 200 may be implemented at a network node 510 in the network 508.

FIG. 5 further schematically illustrates embodiments 514.1 and 514.2 of the radio device, which are generically referred to by reference sign 514. The radio devices 514 are connected or connectable to the RAN 502 by detecting a synchronization signal 512 encoded with the corresponding NR PCI.

Any of the TRxPs belonging to the same NR cell may transmit equivalent synchronization signals 512. Optionally, the TRxPs 504 of the RAN 502 may be differentiated by transmitting synchronization signals 512 encoded with beam identifiers that are different for each TRxP 504 (or for each combination of TRxP 504 and radio device 514). FIG. 5 illustrates, for clarity and not limitation, synchronization signals 512.1 and 512.2 differentiated by the NR cells 506.1 and 506.2, respectively.

Some or each of the radio devices 514 may implement an instance of the device 100. The network 500 informs the radio device 514 by means of the control message, e.g., at connection setup or in response to a report from the radio device 514 on detecting NR PCI=1 transmission (i.e., the transmission of the synchronization signal 512.1) the first time, that there is also a NR PCI=2 transmission (i.e., the transmission of the synchronization signal 512.2) that can be used for synchronization (i.e., as a time reference and/or a frequency reference) by the radio device 514. The control message also informs the radio device 514 to which transmissions of reference signals 516 (e.g., CSI-RSs) the different synchronization signals 512.1 and 512.2 apply.

In the example illustrated in FIG. 5, the network 500 indicates that the synchronization signal 512.1 (i.e., the one encoded with NR PCI=1) and synchronization signal 512.2 (i.e., the one encoded with NR PCI=2) are to be treated as equivalent time and/or frequency synchronization source. That is, the control message is (explicitly or implicitly) indicative of the radio resource (in terms of time and/or frequency) at which the reference signals 516 (e.g., the CSI-RS 1 to 4 from the TRxPs 504.1 to 504.4, respectively) can be found and measured relative to any one of these 2 synchronization signals 512.1 and 512.2.

Otherwise, in case of offsets in time and/or frequency between the 2 synchronization signals 512.1 and 512.2, the control message indicates the offsets, which the radio device 514 takes into account for finding and measuring the respective reference signals.

The radio device 514 has been informed by the control message from the network 500 that NR PCI=2 is synchronized and aligned with NR PCI=1, i.e., the synchronization signal 512.1 encoded with NR PCI=1 and the synchronization signal 512.2 encoded with NR PCI=2 are equal in providing a time and/or frequency reference.

Hence, the synchronization signal 512.1 (e.g., from any one of the first TRxPs 504.1 to 504.3 belonging to the first NR cell 506.1) also provides to the radio device 514.1 the timing and/or frequency reference that can be used for measuring the reference signal 516.21 (e.g., CSI-RS 4) from the second TRxP 504.4 belonging to the neighboring second NR cell 506.2. That is, the radio device 514.1 is enabled by the control message to search and measurements the reference signal from the second TRxP 504.4, while the radio device 514.1 uses any one of the first TRxPs 504.1 to 504.2 as synchronization source. The radio device 514.1 does not have to receive the synchronization signal 512.2. Hence, for the benefit of radio resource efficiency and/or energy efficiency, less synchronization signals 512 can be transmitted by the RAN 502 or the synchronization signals 512 can be transmitted at lower power.

In a cell edge 518 between the NR cells 506.1 and 506.2, the radio device 514.1 can switch between using NR PCI=1 (i.e., the synchronization signal 512.1) and NR PCI=2 (i.e., the synchronization signal 512.2) as synchronization source, e.g., based on quality of the synchronization signal, since the synchronization signals 512.1 and 512.2 are equivalent according to control message for providing the time and/or frequency reference.

If the radio device, e.g., the instance 514.2, is only receiving NR PCI=2 (e.g., occasionally at some point in time due to mobility between NR cells), the radio device 514.2 can still search, find and measure on the radio resources for reference signal transmissions 516.12 and 516.13 related to NR PCI=1 (e.g., CSI-RS 2 and 3 in the illustrated example). Vice versa, when the radio device 514, e.g., the instance 514.1, is only receiving NR PCI=1 (e.g., occasionally at some other point in time), the radio device 514.1 can still search, find and measure on NR PCI=2 related reference signal transmissions (e.g., CSI-RS 4 in the example of FIG. 5). If the radio device 514.1 is receiving both NR PCI=1 and NR PCI=2 (e.g., in the edge area 518), the radio device 514.1 can select the strongest synchronization signal as timing and/or frequency reference or use a combination of the 2 synchronization signals 512.1 and 512.2.

Figure 6:
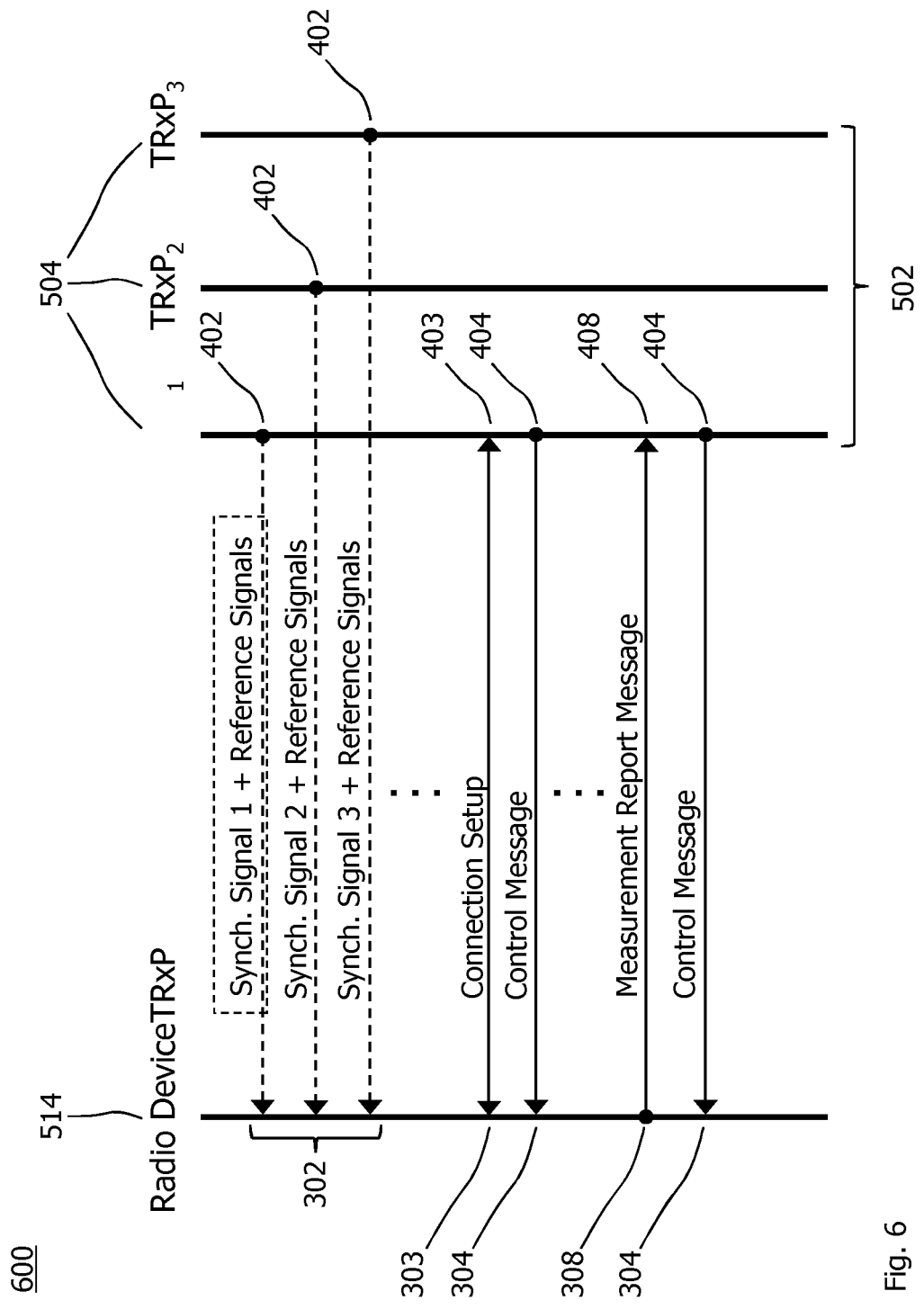
FIG. 6 shows a schematic signaling diagram of a radio communication involving embodiments of the devices of FIGS. 1 and 2.

FIG. 6 shows a schematic signaling diagram resulting from a radio communication involving an embodiment of the device 100 at the radio device 514 and at least one embodiment of the device 200 at the network 500 comprising the TRxPs 504.

The network 500 sends in instances of the step 402 the synchronization signals from multiple TRxPs 504. In the step 302, the radio device 514 receives the synchronization signals 1, 2 and 3, and selects to use the strongest synchronization signal for downlink synchronization, which is the synchronization signal 1 (highlighted by a dashed box) originating from the TRxP 1 in the example of FIG. 6.

In further steps 303 and 403 of the methods 300 and 400 respectively, the radio device 514 initiates a connection setup with the RAN based on the selected synchronization signal 1. When the connection setup is complete, the network 500 sends in the step 404 the control message (e.g., through the TRxP 1) to the radio device indicating usage and timing for a reference signal transmission from signal sources other than the TRxP 1 to which the radio device 514 is currently synchronized. The radio device may then perform measurements on the other signal sources (e.g., TRxP 2 and 3 in the example of FIG. 6).

In the step 308, the radio device 514 sends its measurement report indicative of the signal quality determined for each of the measured TRxPs 504 (e.g., at least the TRxPs 1, 2 and 3 in FIG. 6). In case the report indicates that a signal source other than the selected one (e.g., the TRxP 2) is the strongest synchronization signal, the network 500 may send a further instance of the control message to the radio device 514 indicating an update of the relation, i.e., the information about usage and timing for reference signal transmission from other signal sources.

Embodiments of the devices 100 and 200 for selecting a downlink synchronization source based on the information in control message are described in more detail, e.g., as an elaboration of any of the above implementations or embodiments.

The radio device 514 needs the downlink synchronization with the network 500 to be able to retrieve broadcasted information from the network 500, to transmit data to the network 500 and/or to receive data from the network 500. The radio device 514 does not need to get that downlink synchronization from the same TRxP that is currently used for communication as long as there is a relation (e.g., as to timing and/or frequency) defined by the control message between the candidate synchronization source (i.e., the second TRxP) and the actually used communication TRxP (e.g., the first TRxP).

It is noted that the one or more first TRxPs referenced in the control message as synchronization sources may or may not include the synchronization source currently used for radio communication with the RAN 502. In a typical case, the control message includes the currently used synchronization source (e.g., as the first TRxP) and further synchronization sources (e.g., as the second TRxPs and/or as further first TRxPs), and indicates the respective relations between their synchronization signals and the radio resource for their reference signals (e.g., by indicating the respective relations between the synchronization signals of the synchronization sources, if the location the radio resource is defined by a standard).

The control message may be indicative of the radio resources used by a plurality of second TRxPs for the transmissions of their respective reference signals. Each of the second TRxPs may have a different configuration of radio resources for its reference signals.

Moreover, the control message includes multiple instances of information about relations between synchronization signals and reference signals. In below examples, the control message is indicative of reference signals relative to the synchronization signals 1, 2, 3, 4, 5 and 6. More specifically, the control message is indicative of which synchronization signals can be used (i.e., which of the first TRxPs can be used as the synchronization source) to find (and, thus, to measure) certain reference signals relating to the multiple second TRxPs.

For example, the control message indicates that synchronization signal 1 can be used to find reference signals 1, 2, 3, 4; and synchronization signal 2 can also be used to find reference signals 1, 2, 3, 4. That is, the synchronization signals 1 and 2 are fully equivalent.

Alternatively or in addition, the control message may indicate that synchronization signal 3 can be used only for finding reference signal 5. Synchronization signal 4 can be used only for finding reference signals 4 and 5. That is, synchronization signals 3 and 4 are partly equivalent, namely only for measuring the reference signal 5.

Alternatively or in addition, the control message may indicate that synchronization signal 5 can be used only for finding reference signal 6; and synchronization signal 6 can be used only for finding reference signals 7 and 8. That is, the radio device cannot assume the synchronization signals 5 and 6 to be related.

Figure 7:
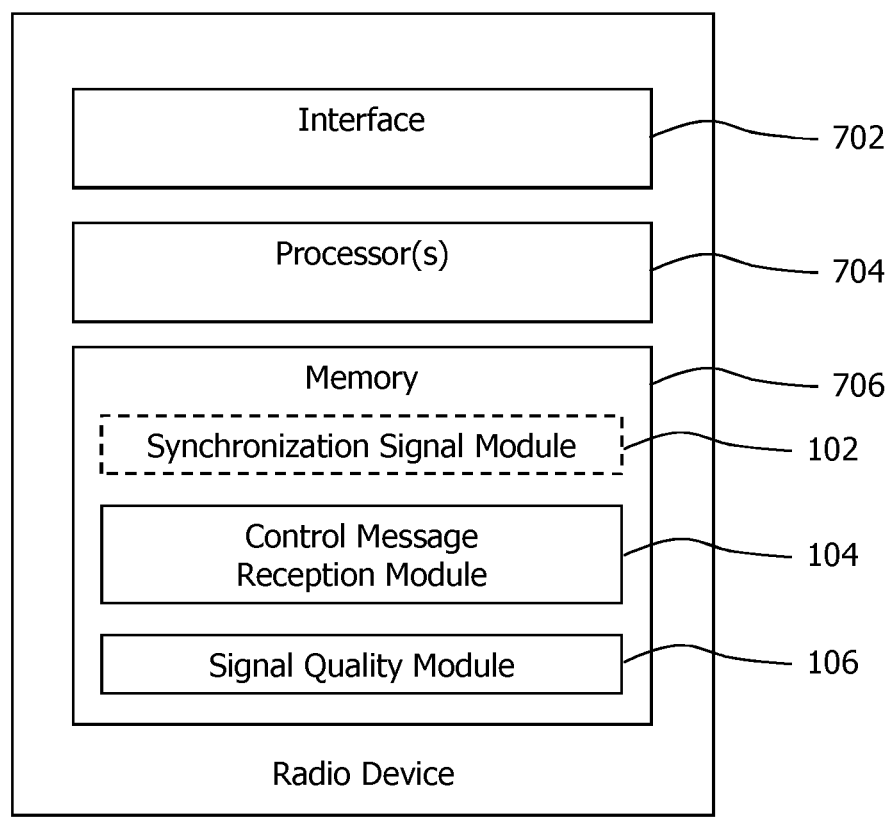
FIG. 7 shows a schematic block diagram of an embodiment of a radio device for performing the method of FIG. 3.

FIG. 7 shows a schematic block diagram for an embodiment of a radio device 514. The radio device 514 comprises a radio interface 702 for radio communication with at least a TRxP, one or more processor circuits 704 for performing the method 300 and memory 706 coupled to the processor circuits 704. The memory 706 is encoded with instructions that implement each of the modules 104 and 106, and optionally 102.

The one or more processor circuits 704 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 706, radio device functionality. For example, the one or more processor circuits 704 may execute instructions stored in the memory 706. Such functionality may include providing various features and steps discussed herein, including any of the benefits disclosed herein.

Figure 8:
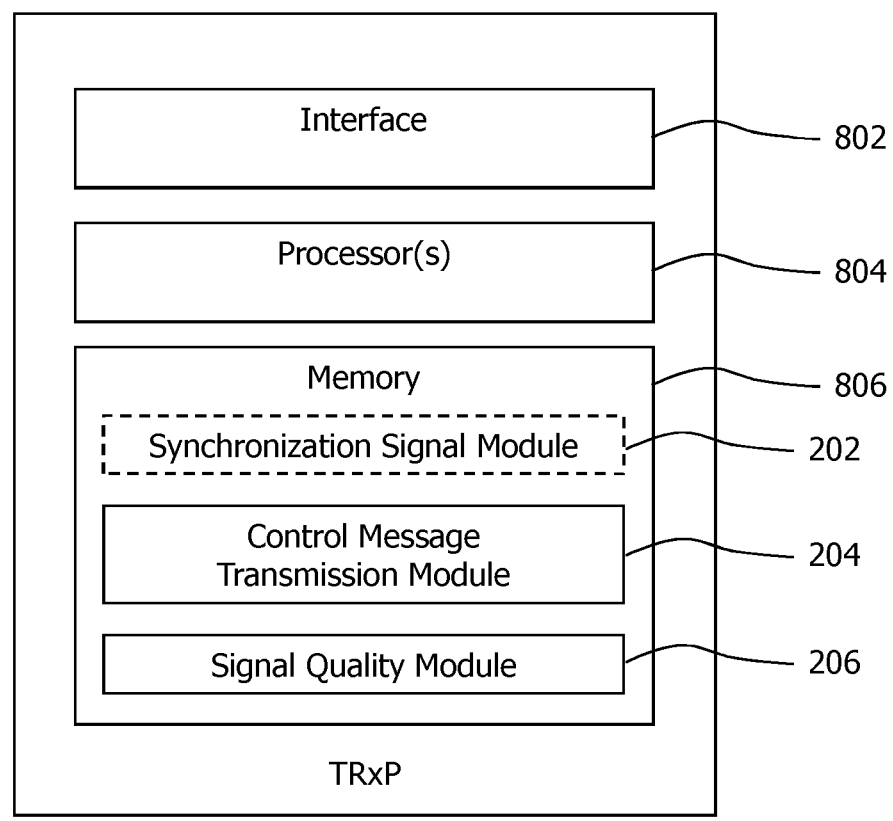
FIG. 8 shows a schematic block diagram of an embodiment of a transmission-reception point for performing the method of FIG. 4.

FIG. 8 shows a schematic block diagram for an embodiment of a transmission-reception point (TRxP) 504. The TRxP 504 comprises a radio interface 802 for radio communication with at least a TRxP, one or more processor circuits 804 for performing the method 400 and memory 806 coupled to the processor circuits 804. The memory 806 is encoded with instructions that implement each of the modules 204 and 206, and optionally 202.

The one or more processor circuits 804 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 806, radio device functionality. For example, the one or more processor circuits 804 may execute instructions stored in the memory 806. Such functionality may include providing various features and steps discussed herein, including any of the benefits disclosed herein.

As has become apparent from above description of exemplary embodiments, high layer mobility mechanism (e.g., RCC mobility such as blind detection of synchronization signals and/or event reporting triggered by crossing thresholds preconfigured for the determined signal quality) can be used to support a faster low layer mobility (e.g., implemented on the MAC and/or PHY layer) based on non-blind reference signal transmission measurement and reporting. By using high layer support (e.g., blind PCI detection and reporting), the control signaling for any low layer mobility solution can be reduced, even if non-blind detection of TRxPs and/or beams has to be used locally.

The technique can enable the network to create a macro diversity properties for the downlink synchronization signal acquisition at the radio devices using the network. Robust downlink synchronization acquisition and maintenance at the radio device is essential for radio devices that use the downlink synchronization as time and/or frequency reference when searching for reference signal transmissions sent from different TRxPs or beams in the network. Moreover, the macro diversity properties for the downlink synchronization signal acquisition at radio devices can be implemented for a more robust Radio Link Failure evaluation.

The technique can also be implemented for a transparent handover of a radio device between TRxPs. The network can change which TRxP actually transmits and/or receives without explicitly informing the radio device about it. The implementation allows lower layer mobility to continue seamless over PCI borders without using high layer handover.

The technique can enable energy efficiency and/or radio resource efficiency by transmitting synchronization signals (e.g., encoded with a PCI) only from a subset of the TRxPs, and still achieve good mobility performance based on reference signal transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of determining signal quality of a radio access network (RAN) comprising a plurality of transmission-reception points (TRxPs), the method comprising:
receiving a control message for determining the signal quality based on a measurement of a reference signal from a second TRxP at a radio resource, the control message being indicative of the radio resource for the reference signal relative to a synchronization signal from a first TRxP other than the second TRxP.

2. The method of claim 1, further comprising determining the signal quality based on the measurement of the reference signal from the second TRxP at the radio resource.

3. The method of claim 1, further comprising receiving the synchronization signal from the first TRxP of the RAN.

4. The method of claim 1, wherein the control message is received from the first TRxP or a node of the RAN.

5. The method of claim 1, wherein the control message is indicative of the radio resource relative to the synchronization signal by:

relating at least one of a timing and a frequency specified by the synchronization signal from the first TRxP to at least one of a timing and a frequency of the second TRxP;

relating a first radio resource structure specified by the synchronization signal from the first TRxP to a second radio resource structure of the second TRxP;

indicating at least one of an equivalence and an offset between a first radio resource structure specified by the synchronization signal from the first TRxP and a second radio resource structure of the second TRxP;

indicating equivalence between a first timing specified by the synchronization signal from the first TRxP and a second timing of the second TRxP or by indicating synchronization between the first TRxP and the second TRxP;

indicating a time offset between a first timing specified by the synchronization signal from the first TRxP and a second timing of the second TRxP;

indicating equivalence between a first frequency specified by the synchronization signal from the first TRxP and a second frequency of the second TRxP or by indicating an intra-frequency relation between the first TRxP and the second TRxP; or indicating a frequency offset between a first frequency specified by the synchronization signal from the first TRxP and a second frequency of the second TRxP.

6. The method of claim 1, wherein the control message is further indicative of a periodicity or a time-frequency pattern of the reference signal from the second TRxP.

7. The method of claim 1, wherein the first TRxP and the second TRxP are base stations of the RAN, or support or belong to different cells of the RAN, or support or provide different beams of the RAN.

8. The method of claim 1, wherein:
the first TRxP is associated with at least one of a first cell identifier and a first beam identifier, and/or
the second TRxP is associated with at least one of a second cell identifier different from the first cell identifier and a second beam identifier different from the first beam identifier.

9. The method of claim 1, further comprising reporting, to the RAN, the determined signal quality associated with the second TRxP.

10. The method of claim 9, wherein the report to the RAN includes each of the determined signal qualities in association with the corresponding one of the second TRxPs by including in the report the second cell identifier and/or the second beam identifier of the corresponding one of the second TRxPs.

11. The method of claim 9, wherein the at least one determined signal quality is included in or implemented by channel state information (CSI), and/or a precoding matrix indicator (PMI).

12. The method of claim 1, wherein the at least one determined signal quality is indicative of at least one channel estimate based on the corresponding reference signal or of at least one received power of the corresponding reference signal.

13. The method of claim 1, further comprising transmitting data to the RAN, and/or receiving data from the RAN, based on the at least one determined or reported signal quality.

14. The method of claim 13, wherein the transmission and/or the reception uses beamforming or a multiple-input multiple-output (MIMO) radio channel based on the at least one determined or reported signal quality.

15. The method of claim 13, wherein the transmission and/or the reception includes a coordinated multipoint (CoMP) transmission and/or a CoMP reception using the first and second TRxPs and/or a handover from the first TRxP to the second TRxP based on the at least one determined or reported signal quality.

16. A method of determining signal quality of a radio access network (RAN) comprising a plurality of transmission-reception points (TRxPs), the method comprising:
transmitting a control message for determining the signal quality based on a measurement of a reference signal from a second TRxP at a radio resource, the control message being indicative of the radio resource for the reference signal relative to a synchronization signal from a first TRxP other than the second TRxP.

17. The method of claim 16, further comprising receiving a report of, or a radio communication based on, the signal quality determined based on the measurement of the reference signal from the second TRxP at the radio resource.

18. The method of claim 16, wherein the control message is transmitted from the first TRxP or a node of the RAN.

19. A non-transitory computer readable recording medium storing a computer program product for determining signal quality of a radio access network (RAN) comprising a plurality of transmission-reception points (TRxPs), the computer program product comprising software instructions which, when run on processing circuitry of a computing device, causes the computing device to:
receive a control message for determining the signal quality based on a measurement of a reference signal from a second TRxP at a radio resource, the control message being indicative of the radio resource for the reference signal relative to a synchronization signal from a first TRxP other than the second TRxP.

20. A non-transitory computer readable recording medium storing a computer program product for determining signal quality of a radio access network (RAN) comprising a plurality of transmission-reception points (TRxPs), the computer program product comprising software instructions which, when run on processing circuitry of a computing device, causes the computing device to:
transmit a control message for determining the signal quality based on a measurement of a reference signal from a second TRxP at a radio resource, the control message being indicative of the radio resource for the reference signal relative to a synchronization signal from a first TRxP other than the second TRxP.

21. A device for determining signal quality of a radio access network (RAN) comprising a plurality of transmission-reception points (TRxPs), the device comprising:
processing circuitry;
memory containing instructions executable by the processing circuitry whereby the device is operative to receive a control message for determining the signal quality based on a measurement of a reference signal from a second TRxP at a radio resource, the control message being indicative of the radio resource for the reference signal relative to a synchronization signal from a first TRxP other than the second TRxP.

22. A device for determining signal quality of a radio access network (RAN) comprising a plurality of transmission-reception points (TRxPs) the device comprising:
processing circuitry;
memory containing instructions executable by the processing circuitry whereby the device is operative to transmit a control message for determining the signal quality based on a measurement of a reference signal from a second TRxP at a radio resource, the control message being indicative of the radio resource for the reference signal relative to a synchronization signal from a first TRxP other than the second TRxP.

* * * * *